US006988769B2

(12) United States Patent
LaPointe

(10) Patent No.: US 6,988,769 B2
(45) Date of Patent: Jan. 24, 2006

(54) SPRING TOGGLE FURNITURE MECHANISM

(75) Inventor: Larry P. LaPointe, Temperance, MI (US)

(73) Assignee: La-Z-Boy Incorporated, Monroe, MI (US)

( * ) Notice: Subject to any disclaimer, the term of this patent is extended or adjusted under 35 U.S.C. 154(b) by 0 days.

(21) Appl. No.: 10/849,995

(22) Filed: May 20, 2004

(65) Prior Publication Data

US 2005/0258670 A1 Nov. 24, 2005

(51) Int. Cl.
*A47C 1/02* (2006.01)

(52) U.S. Cl. ........................... 297/85; 297/68; 297/69; 297/83; 297/85

(58) Field of Classification Search .................. 297/68, 297/69, 83, 94, 84, 85
See application file for complete search history.

(56) References Cited

U.S. PATENT DOCUMENTS

| | | | | |
|---|---|---|---|---|
| 3,869,169 A * | 3/1975 | Johnson et al. | 297/84 |
| 3,937,518 A * | 2/1976 | Harrison | 297/83 X |
| 4,072,342 A * | 2/1978 | Johnson et al. | 297/84 |
| 4,185,870 A * | 1/1980 | Johnson | 297/84 |
| 4,212,495 A * | 7/1980 | Gall | 297/84 |
| 4,226,468 A * | 10/1980 | Johnson | 297/84 |
| 4,270,796 A * | 6/1981 | Preston | 297/69 |
| 4,364,603 A * | 12/1982 | Johnson | 297/84 |
| 4,367,895 A * | 1/1983 | Pacitti et al. | 297/84 X |
| 4,477,118 A * | 10/1984 | Ruble | 297/68 X |
| 4,662,673 A * | 5/1987 | Crum | 297/68 |
| 4,895,411 A * | 1/1990 | Pine | 297/68 X |
| 5,011,220 A * | 4/1991 | LaPointe | 297/84 X |
| 5,054,850 A * | 10/1991 | Pine | 297/84 |
| 5,129,701 A * | 7/1992 | Pine | 297/68 |
| 5,147,108 A * | 9/1992 | LaPointe | 297/68 X |
| 5,156,441 A | 10/1992 | Byersmith et al. | 297/68 X |
| 5,217,276 A | 6/1993 | LaPointe et al. | 297/68 X |
| 5,222,286 A * | 6/1993 | Saul et al. | 297/83 X |
| 5,271,660 A | 12/1993 | LaPointe et al. | 297/68 X |
| 5,292,170 A * | 3/1994 | LaPointe et al. | 297/68 X |
| 5,301,413 A | 4/1994 | Habegger et al. | 297/83 X |
| 5,323,526 A * | 6/1994 | Saul et al. | 297/83 X |
| 5,382,073 A * | 1/1995 | Habegger et al. | 297/83 X |
| 5,423,591 A * | 6/1995 | LaPointe et al. | 297/84 |
| 5,427,431 A * | 6/1995 | Saul et al. | 297/68 X |
| 5,435,621 A * | 7/1995 | Komorowski et al. | 297/84 |
| 5,527,095 A * | 6/1996 | Marshall et al. | 297/84 X |
| 5,845,961 A | 12/1998 | LaPointe et al. | 297/69 X |
| 5,975,627 A | 11/1999 | LaPointe et al. | 297/68 |
| 6,409,262 B1 | 6/2002 | LaPointe | 297/68 |
| 6,893,085 B2 * | 5/2005 | LaPointe et al. | 297/68 X |

* cited by examiner

*Primary Examiner*—Rodney B. White
(74) *Attorney, Agent, or Firm*—Harness, Dickey & Pierce, P.L.C.

(57) ABSTRACT

A spring assembly for an article of furniture having a seat assembly supported from a chair frame and an actuation mechanism for enabling a leg rest assembly to move between a stowed position and an extended position. The mechanism includes a support shaft, a drive rod spaced apart from the support shaft, and a toggle link coupled to the drive shaft. The spring assembly includes a spring with a first and a second end and adapted to attach to the toggle link at the first end. The spring also includes a member at the second end adapted to slidably engage the support shaft, whereby the spring aligns itself at a position on the support shaft where the length of the spring is at a minimum.

21 Claims, 6 Drawing Sheets

SPRING TOGGLE FURNITURE MECHANISM

FIELD OF THE INVENTION

Conventionally, reclining type articles of furniture (i.e., chairs, sofas, loveseats, and the like) require a mechanism to bias a leg rest assembly in the extended and stowed positions. The mechanisms provided by the prior art include a large number of moving parts that tend to increase the manufacturing time and costs associated with the furniture.

BACKGROUND OF THE INVENTION

Conventionally, reclining type articles of furniture (i.e., chairs, sofas, loveseats, and the like) require a mechanism to bias a leg rest assembly in the extended and stowed positions. The mechanisms provided by the prior art include a large number of moving parts that tends to increase the manufacturing time and costs associated with the furniture.

Moreover, because these parts move to extend and stow the leg rest assembly the parts require alignment relative to one another to ensure proper operation. Additionally, the large number of parts adds weight to the furniture thereby making the furniture difficult to move and transport. Additionally, the occupant of the seat must overcome the biasing force to begin extending the leg rest assembly. Since one of the purposes of providing the leg rest assembly is to increase user comfort, overcoming a large biasing force tends to detract from the user's enjoyment of the furniture.

Once the occupant does overcome the biasing force of the mechanism, though, the large number of moving parts tends to generate noise as the user extends (or stows) the assembly. Also, as the assembly nears its fully extended (or retracted) position, the prior art mechanisms suddenly accelerate (or jerk) to the fully extended position. Again, these disadvantages of the prior art mechanisms detract from the occupant's comfort and enjoyment of the furniture.

Finally, the large number of parts also exposes the furniture to an increased risk of mechanical failure, particularly of those parts subject to cyclic stress (i.e., fatigue). Thus, a need exists to simplify and improve the prior art leg rest mechanisms.

SUMMARY OF THE INVENTION

A biasing assembly is provided by the present invention for an article of furniture having a seat assembly supported from a chair frame and an actuation mechanism for enabling a leg rest assembly to move between a stowed position and an extended position. The mechanism includes a support shaft, a drive rod spaced apart from the support shaft, and a toggle link coupled to the drive shaft. The biasing assembly includes a spring with a first and a second end. The spring is adapted to attach to the toggle link at the first end. The spring also includes an engagement member at the second end adapted to engage the support shaft while remaining free to slide along the axis of the support shaft. Thus, the spring aligns itself on the support shaft.

In another embodiment, the present invention provides an actuation mechanism for an article of furniture having a seat assembly supported from a chair frame and a leg rest assembly. The leg rest assembly is moveable between a stowed position and an extended position. The actuation mechanism enables the movement of the leg rest assembly and includes a support shaft; a drive rod spaced apart from the support shaft; a toggle link coupled to the drive shaft; and a biasing assembly. The biasing assembly includes a spring with a first and a second end. The spring is attached to the toggle link at the first end and includes an engagement member at the second end that engages the support shaft while remaining free to slide along the axis of the support shaft. Thus, the spring aligns itself on the support shaft. In yet another embodiment, the present invention provides an article of furniture including such a mechanism.

In another form, the present invention provides a method of assembling an article of furniture. The assembled article of furniture will have a seat assembly supported from a chair frame and an actuation mechanism for enabling a leg rest assembly to move between a stowed position and an extended position. Moreover, the assembled mechanism will include a support shaft, a drive rod spaced apart from the support shaft, and a toggle link coupled to the drive shaft. Furthermore, the method includes attaching a spring of a spring assembly to the toggle link at a first end of the spring and engaging a member of the spring assembly at a second end of the spring to the support shaft while remaining free to slide along the axis of the support shaft. Accordingly, the spring aligns itself on the support shaft.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

In accordance with the teachings of the present invention, an improved actuation mechanism 10 for use in single and multi-person articles of furniture 12 (i.e. chairs and sofas or loveseats) is disclosed. In addition, the present invention is also directed to a method of assembling the improved actuation mechanism of an article of furniture having a leg rest assembly (e.g., a recliner or the like). As will be described, the actuation mechanism 10 contains fewer parts and is accordingly simpler, lighter, and more reliable than the prior art actuation mechanisms. Concomitantly, the present invention facilitates application of highly efficient fabrication and assembly processes.

The actuation mechanism 10 of the present invention includes a single spring mechanism 14 to bias the leg rest assembly 16 in the stowed and extended positions. Moreover, the single spring mechanism 14 simplifies the assembly process and improves the reliability of the actuation mechanism 10. In the disclosed embodiments, the article of furniture 12 includes a pre-assembled actuation mechanism 10 and various upholstered frame components (not shown). Moreover, since the actuation mechanism 10 of the present invention is relatively compact in size, the use of loose upholstered cushions, which is an important feature in marketing various styles of chair, sofa or loveseat furniture, is also possible.

Figure 1:
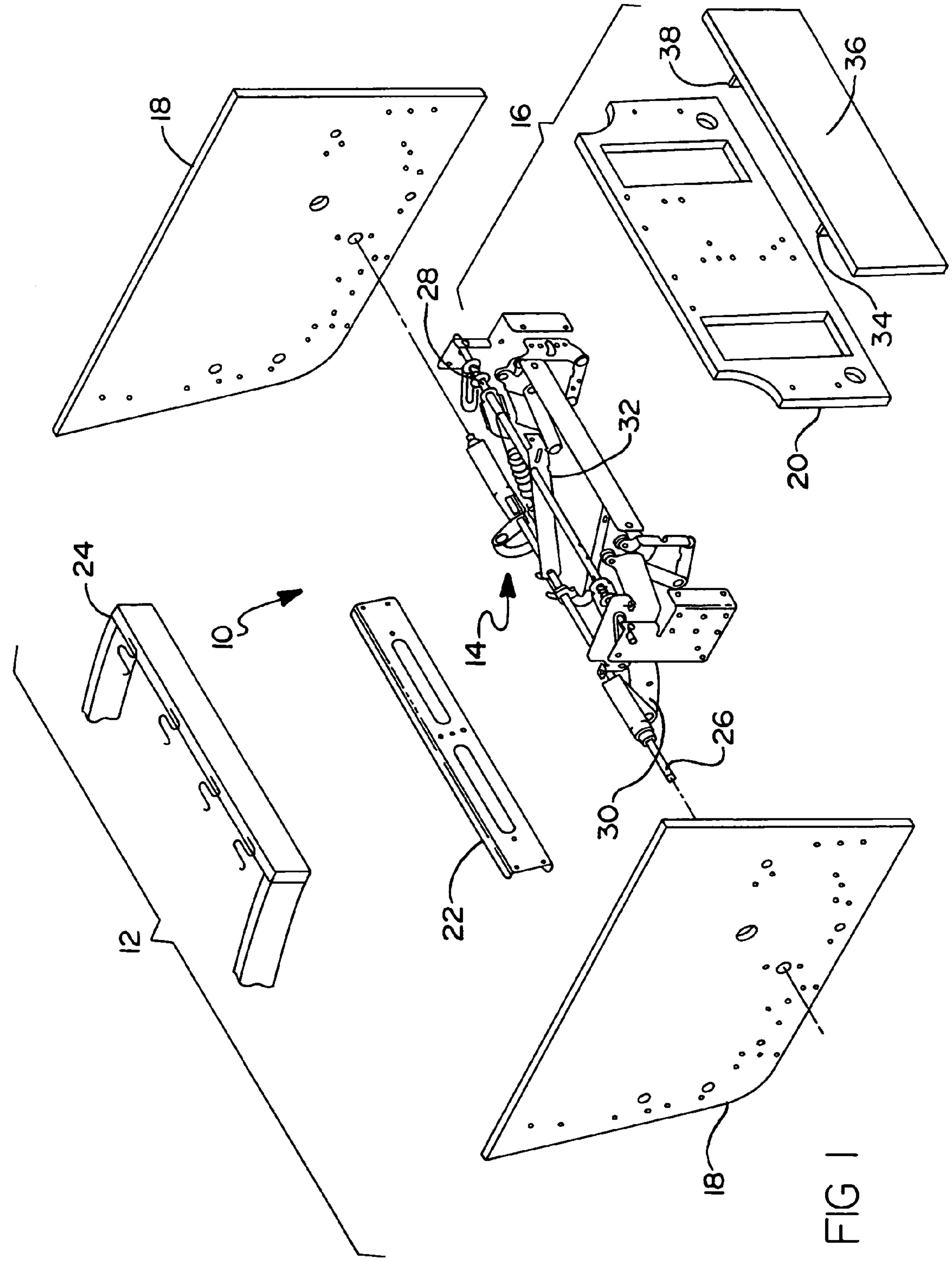
FIG. 1 is an exploded perspective view of a chair with upholstery, springs and other parts removed from the preassembled components for illustrating an improved actuation mechanism.

With particular reference now to the drawings, the functional and structural aspects of actuation mechanism 10, shown operably suspended from the various pre-upholstered box-like frame components of a chair 12 (partially shown), will now be described. For purposes of clarity, FIG. 1 shows the various pre-assembled frame components with their upholstery, padding, springs, etc. removed to better illustrate the interdependency of the frame components construction which can be rapidly and rigidly assembled in a relative easy and efficient manner. Therefore, all of the frame components can be individually fabricated or sub-assembled to include the requisite brackets, springs, padding and upholstery on an "off-line" batch-type basis. Thereafter, the various pre-assembled and upholstered frame components are assembled for totally integrating actuation mechanism 10 therein.

Figure 2:
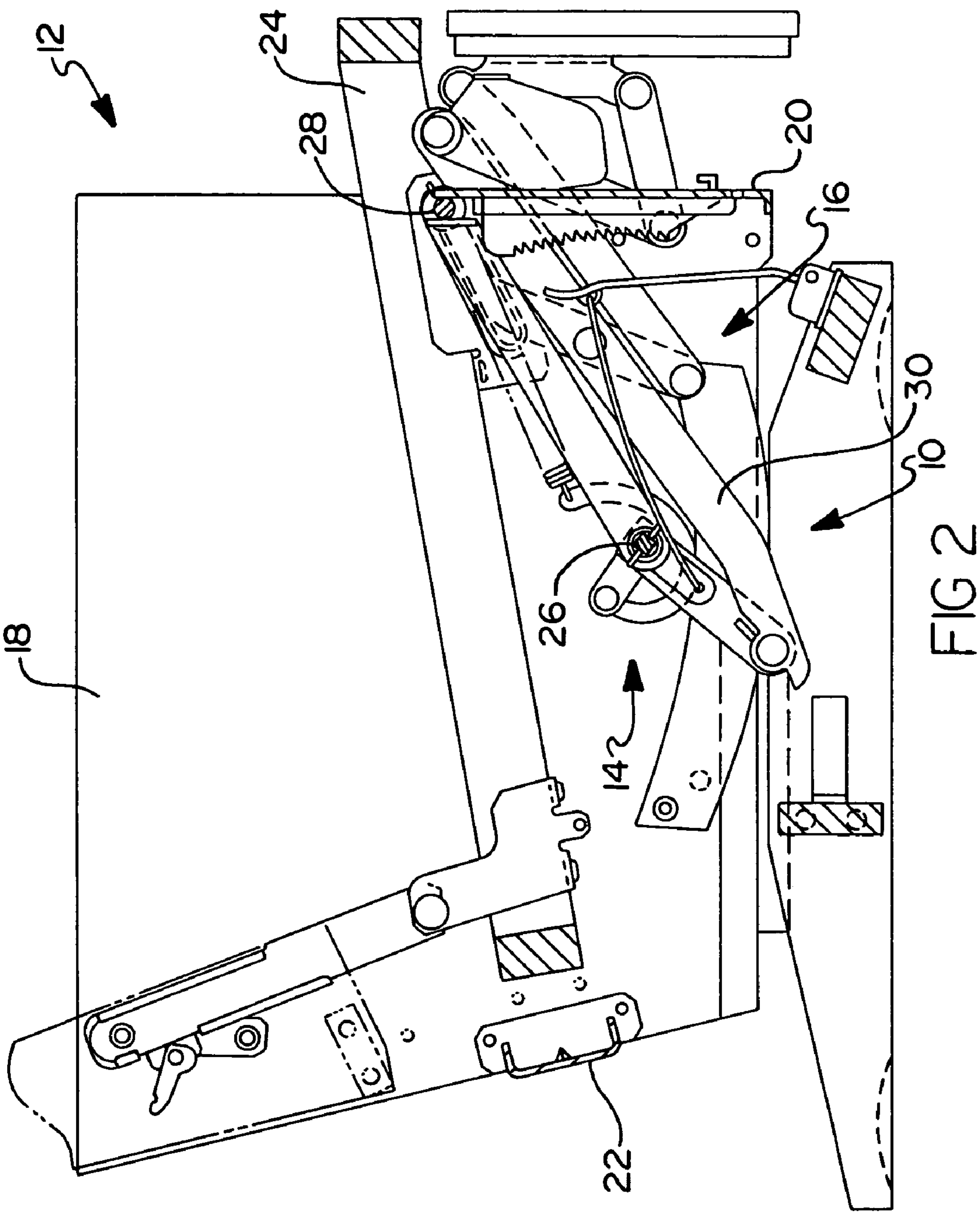
FIG. 2 is a top plan view of a leg rest mechanism of the chair of FIG. 1 in accordance with a preferred embodiment of the present invention.
Figure 3:
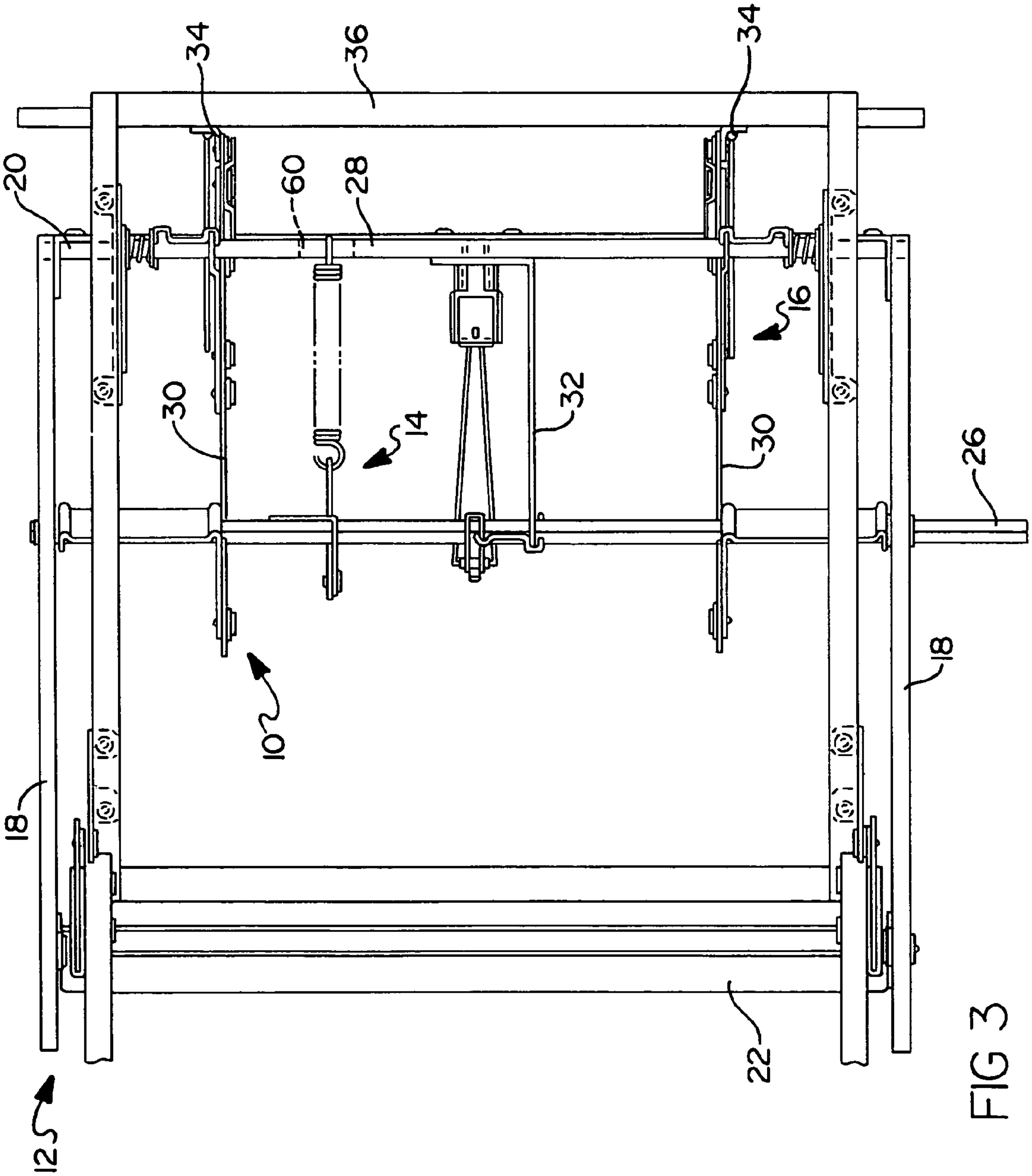
FIG. 3 is an elevation view of a leg rest mechanism of the chair of FIG. 1 in accordance with a preferred embodiment of the present invention.

As seen in FIGS. 1 through 3, actuation mechanism 10 of chair 12 is integrated into and operably suspended from left and right side frame assemblies 18. In addition to side frame assemblies 18, chair 12 also includes front and rear rail assemblies 20, 22, respectively, which when interconnected define a rigid "box-like" chair frame. Seat assembly 24 is supported within the side frame assemblies 18 and an actuation mechanism 10. As will be described in greater detail hereinafter, actuation mechanism 10 is pre-assembled to include a drive rod 26 and front support shaft 28, both of which are spatially oriented to be precisely located and "suspended" from left and right side frame assemblies 18.

Actuation mechanism 10 is shown to support leg rest assembly 16 thereon. More specifically, leg rest assembly 16 includes left and right pantograph linkage mechanisms 30 and the single spring-assisted toggle mechanism 14 which is operably associated with drive rod 26 and front support shaft 28 to selectively actuate leg rest assembly 16. A rigid cross-brace 32 is secured between drive rod 26 and support shaft 28 for providing structural rigidity within actuation mechanism 10. One end of cross-brace 32 is journally supported on drive rod 26 while the opposite end thereof is configured as a bracket 34 which is fixedly secured (such as by a suitable threaded fastener) to an inner surface of front rail assembly 20. Furthermore, support shaft 28 is fixed to an intermediate portion of cross-brace 32 to inhibit rotation of support shaft 28 upon rotation of drive rod 26. In the preferred construction, drive rod 26 is an elongated square shaft having a handle portion (not shown) provided adjacent an upholstered exterior portion of one of side frame assemblies 18 that can be easily reached by a person seated in chair 10 for convenient actuation thereof.

As best seen in FIG. 1, most of the structural frame components such as side frame assemblies 18, front rail assembly 20, rear rail assembly 22, seat assembly 24, and leg rest frame board 36 are each constructed in a manner which enables them to support springs, padding, upholstery, etc. in order to complete a decorative and stylish chair 12. Preferably, each of these frame components is fabricated from one or more wood panels and/or rails that are fixedly secured together by suitable fasteners, such as dowels, staples, nails and screws, and which may be reinforced at critical joints by metal reinforcement plates or brackets and/or wood corner blocks in a known manner. As previously noted, each frame component is individually pre-assembled for subsequent assembly into the chair 12. However, it is to be understood that the specific construction shown for each frame component is merely exemplary in nature.

Leg rest assembly 16 is shown to include frame board 36 having an outer surface that is padded and upholstered. Frame board 36 is supported and moved by identical left and right hand pantograph linkages 30. Pantograph linkages 30 may be similar in function and structure to that shown in FIG. 3 of U.S. Pat. No. 3,096,121, assigned to the common Assignee of the present invention, with the exception that pantograph linkages 30 are operably suspended about the second set of "fixed" suspension points defined by support shaft 28.

As best seen in FIGS. 2 and 3, the single spring-assisted toggle assembly 14 is provided which works coactively with leg rest pantograph linkages 30. Toggle assembly 14 provides means for securely holding frame board 36 of leg rest assembly 16 in a fully retracted position against front rail assembly 20. Toggle assembly 14 is also operable to supply a spring force for biasingly urging leg rest assembly 16 toward one of its extended and retracted positions. More particularly, toggle assembly 14 includes a toggle lever 38 with a square hole 40 which is mounted by means of the square hole 40 on square drive rod 26 for rotation therewith. Toggle lever 38 is pivotally connected at pivot 42 to rear leg 44 of a C-shaped toggle link 46 that curves around, below and to the rear of drive rod 26 where its front leg 48 has an opening 50 to which an attachment means 56 in the form of a hook at one end of a helical coil spring 52 is attached. The toggle lever 38 of toggle assembly 14 is positively located on drive rod 26 by means of a fastener 58 for maintaining the toggle assembly 14 in place on drive rod 26. The configuration of aperture 40 in combination with the use of fastener 58 having the advantage of integrally coupling the toggle lever 38 with the drive rod 26. Thus, the spring 52 will not cause the toggle lever 38 to jump as the toggle assembly 14 rotates over center.

The opposite end of spring 52 includes an engagement member 54 that is slidably engaged with the support shaft 28. More specifically, the engagement member 54 is configured to couple the spring 52 with the support shaft 28 while remaining free to slide along the axis of the support shaft 28. Taken together, the spring 52, the engagement member 54, and attachment means 56 at the other end of the spring 52 may be referred to as a biasing element that may also be formed as one continuous part such as by forming the biasing assembly from a suitable wire. However, the biasing element may be formed by multiple components. A tension adjustment means (not shown) may be optionally provided for adjusting the tension in spring 52. For example, the tension in spring 52 can be adjusted by relatively increasing or decreasing the length and hence the preload in the spring.

Operation of toggle assembly 14 will now be described in detail. The location of pivot 42 above drive rod 26 and the line of action of spring 52 are such that in the retracted position of leg rest assembly 16, the spring force acts to blazingly hold or "retain" leg rest assembly 16. As leg rest 16 is initially extended upon slight rotation of drive rod 26, pivot 42 moves down and over center of an imaginary line between about the center of the engagement member 54 (e.g., hook) and the axis of drive rod 26. Once pivot 42 is over-center, tension loading on spring 52 assists in drivingly rotating drive rod 26 for extending leg rest assembly 16 as front leg 48 of link 46 is pulled toward engagement member 54. In addition, spring 52 assists the seat occupant in pivoting handle (not shown) through the required actuation angle. In similar fashion, toggle assembly 14 is adapted to utilize the spring biasing force of spring 52 to assist in returning leg rest assembly 16 to its stowed position upon reverse rotation of the drive rod 26.

Figure 5:
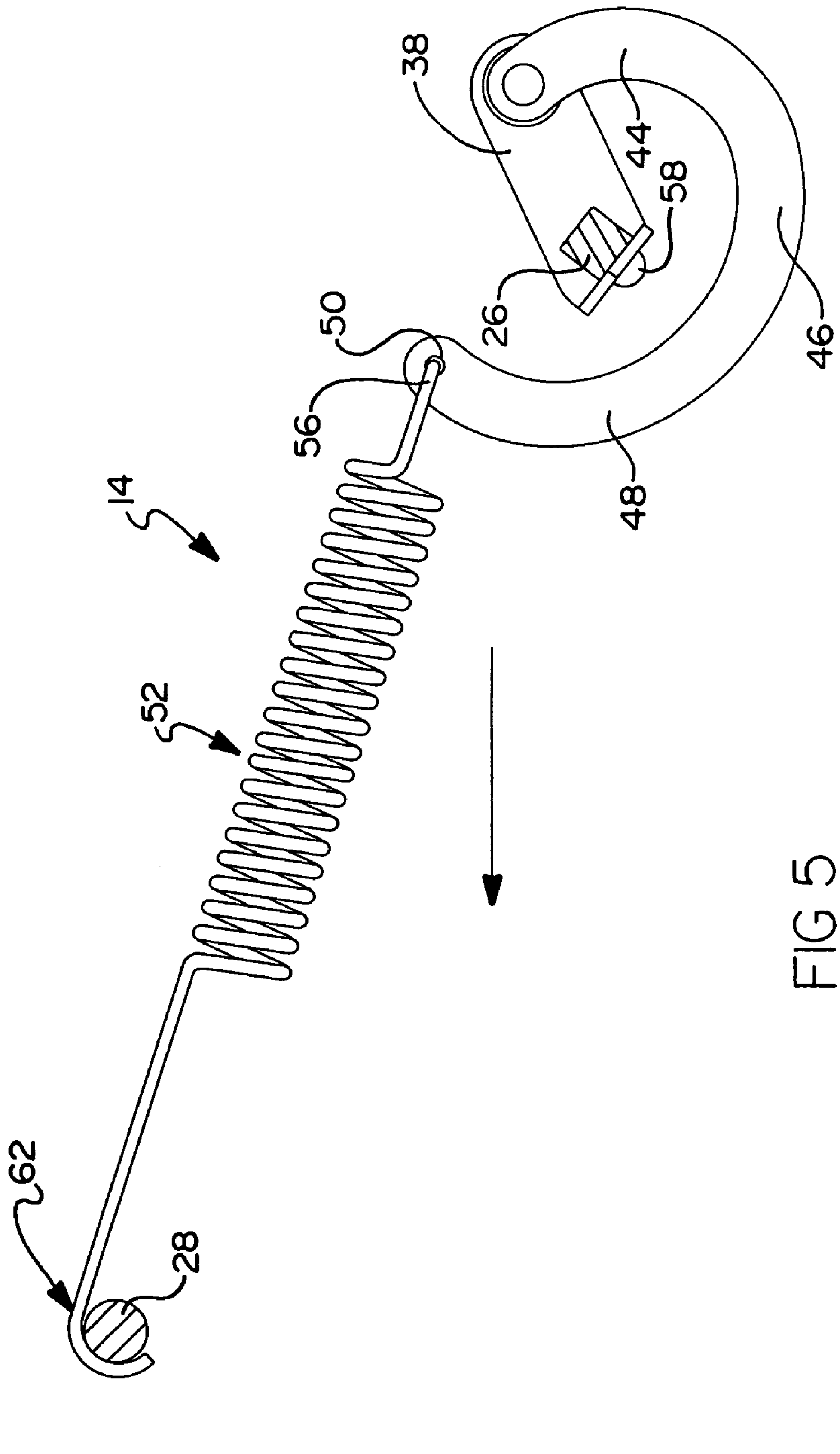
FIG. 5 is an elevation view of the spring toggle assembly of the mechanism of FIG. 4 in a retracted position.
Figure 6:
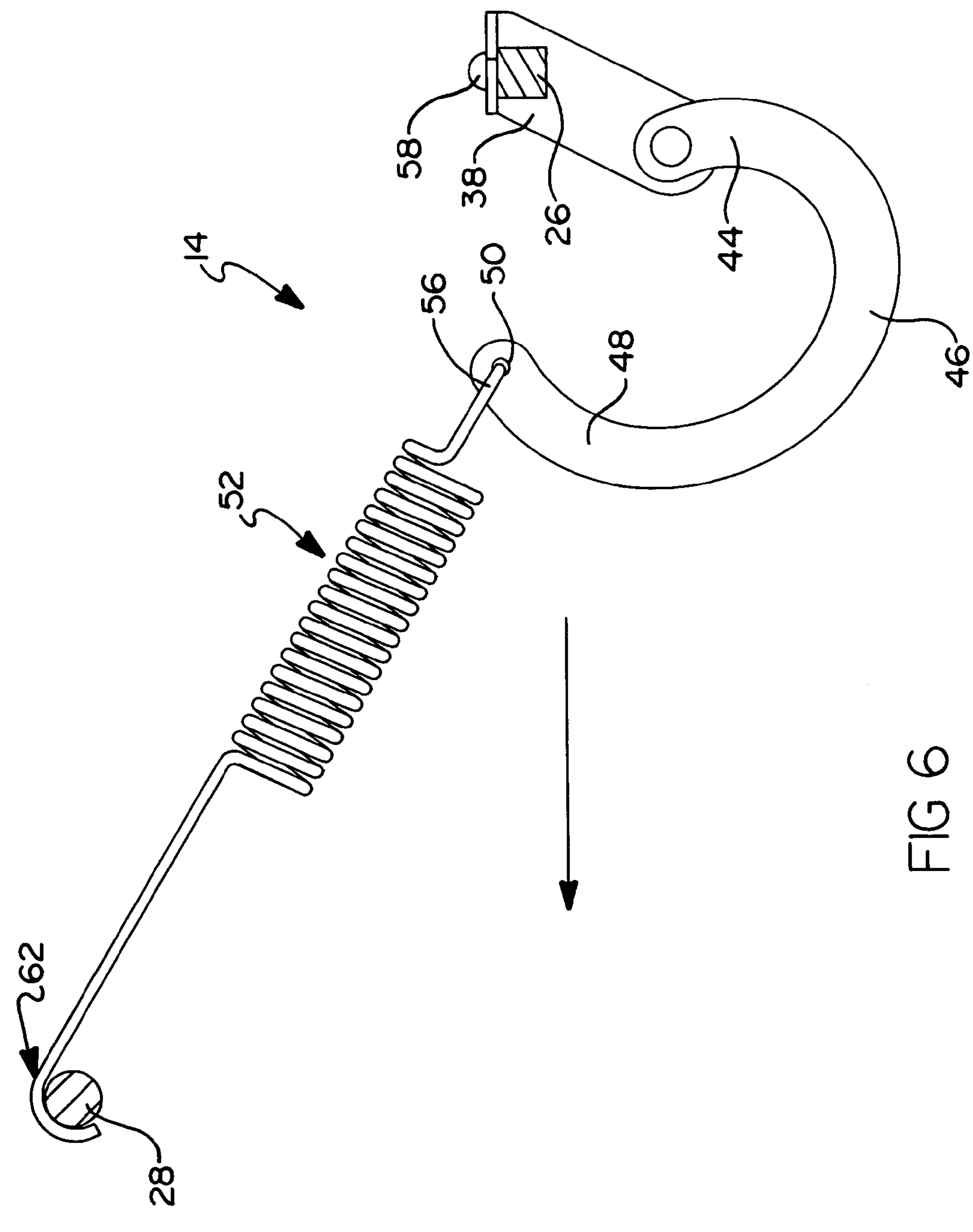
FIG. 6 is an elevation view of the spring toggle subassembly of the mechanism of FIG. 4 in an extended position.

Now with reference to FIGS. 5 and 6, more differences between the stowed and retracted positions of the leg rest assembly 16 are illustrated. First, the C shaped toggle link 46 has rotated about the drive shaft 26 from the retracted position (see FIG. 5) to the extended position (see FIG. 6). As can be see, in the retracted position about half of the C-shaped toggle link 46 is shown on the side of the drive shaft 26 opposite that of the spring 52 whereas in the extended position substantially all of the C-shaped toggle link 46 is on the same side of the drive shaft 26 as the spring 52. Thus, the spring 52 is stretched less in the extended position than in the retracted position. Accordingly, the biasing force developed by the spring in the retracted position exceeds the biasing force developed in the extended position. However, in another embodiment the extended biasing force exceeds the retracted biasing force.

From a comparison of FIGS. 5 and 6, it can be seen that the toggle assembly 14 and in particular the toggle lever 28 rotates through about 145° of rotation from the retracted position to the extended position and cross the over center position after about 50° of rotation. In this manner, the kinematics of the toggle assembly is timed to provide a force balanced through the range of motion (i.e., retraction to extension and visa versa) which results in a smoothly operating leg rest assembly.

Figure 4:
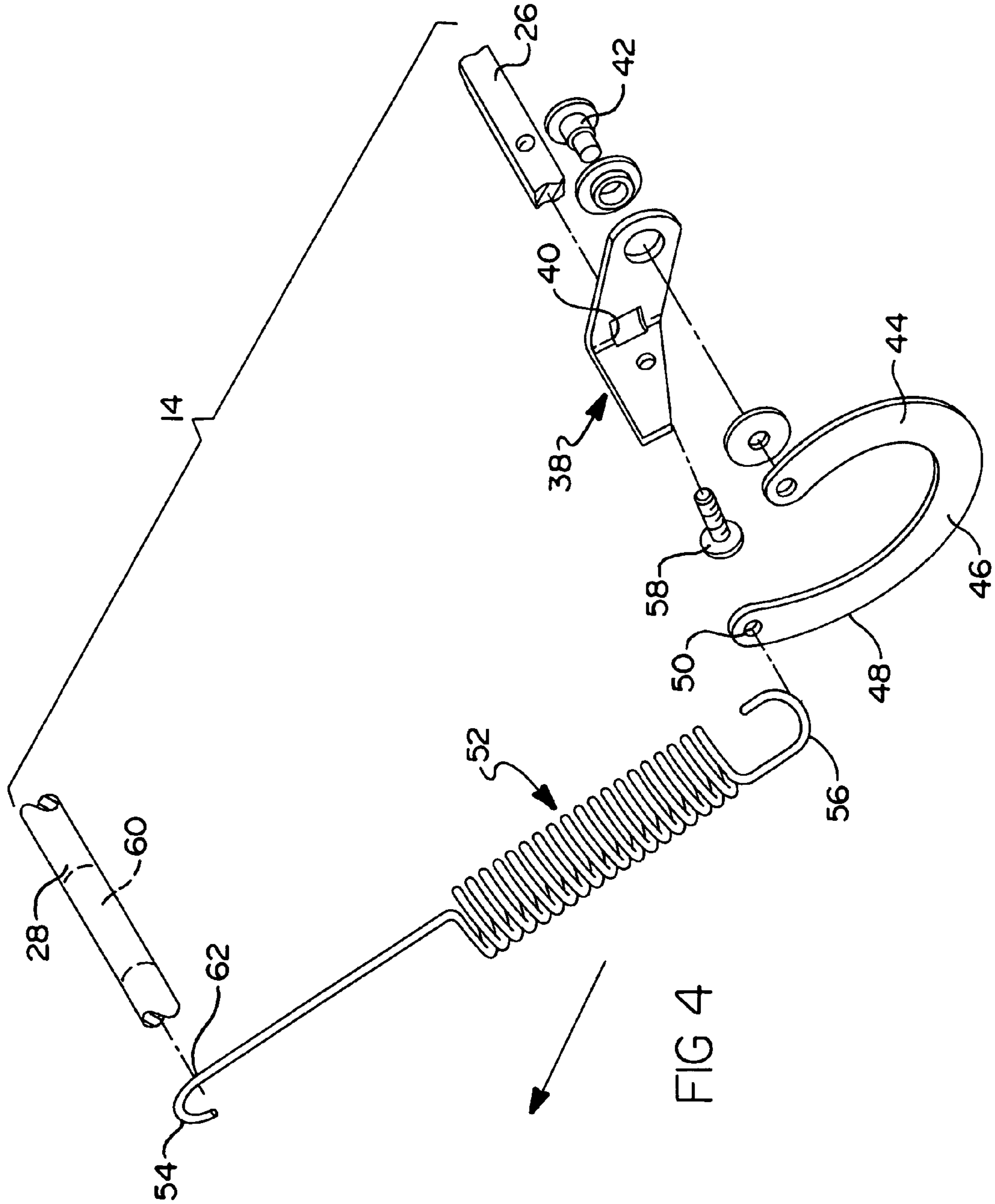
FIG. 4 is an exploded perspective view of a spring toggle assembly of the mechanism of FIG. 1.

With continuing reference now to FIGS. 5 and 6, the spring 52 with member 54 slidably engaged on the support shaft 28 is also illustrated. In particular, a portion 60 of the support shaft 28 is shown in FIGS. 3 and 4. The portion 60 is generally free from obstructions, which would otherwise prevent the engagement member 54 from sliding along the portion 60. Generally, portion 60 is positioned on the support shaft 28 opposite the location of the fastener 58 on the drive rod 26.

Accordingly, the spring 52 acting in tension will tend to pull the engagement member 54 toward the center of the portion 60. Thus, the spring 52 will slide along the length of the support shaft 28 and align itself between the drive rod 26 and the support shaft 28 where the spring 52 is at a minimum installed length. In other words, the spring 52 can be deemed a self-aligning member of the mechanism 10. An anti-friction agent such as wax or oil may be provided locally on the portion 60 of support shaft 28 to promote self-alignment. Because of the self-alignment of the spring 52, the spring 52 will experience a lower, and more predictable, level of cyclic stress during operation. Accordingly, the spring 52 (and similarly stressed components) will last longer than non self-aligning springs that experience a similar stress environment. Though, of course, the single spring 52 is generally sized to provide the desired biasing forces without requiring a second or subsequent springs.

By way of comparison, the prior art devices typically use one or more wires, spacers, springs, retaining clips, and the like to maintain multiple spring toggles in alignment with the other components of the recliner 12. Thus, movement of the prior art spring toggles caused all of these various components to move and vibrate. Accordingly, operation of the prior art recliners produces more noise than the chairs 12 of the present invention. In contrast, the spring toggle assembly 14 provided by the present invention requires no aids to align the single spring toggle 14. Accordingly, the present invention provides quieter operation. Additionally, by eliminating the alignment aids and reducing the number of spring toggles to one (and only one spring toggle in a preferred embodiment) the present invention significantly reduces the part count of the chair 12. Thus, the chair 12 is simpler, lighter, less expensive, and more reliable than the prior art recliners.

Turning now to a detailed discussion of the load points of the spring 52, those skilled in the art will appreciate that the upholstery and padding applied to the leg rest assembly 16 may cause relatively minor forces to act on the actuation mechanism 16. Some of these forces will tend to move the leg rest assembly 16 toward either the retracted or the extended positions. Thus, it should be noted herein that the term biasing force refers to the force developed specifically by the spring 52 unless expressly stated otherwise.

With regard to the load points of the spring 52, it has been found that occupants of the chair 12 prefer an actuation mechanism 10 that they perceive as operating smoothly (e.g., without sudden acceleration or jerks of the leg rest assembly 16). Thus, in a preferred embodiment, the spring is 5.8 inches long in a completely neutral state and has a spring rate of 30 pounds per inches and an initial pre load of 17 pounds. Additionally, the spring 52 may be placed relative to the drive rod 26 and the support shaft 28 such that the spring is elongated by about 7.75 inches in the extended position. Thus, the preferred extended biasing force is about 83 pounds. In the retracted position the spring may be likewise be elongated about 7.0 inches to provide a biasing force of about 54 pounds. Presently, the spring 52 is designed for a maximum extension of 8.5 inches.

Meanwhile, in the over center position (relative to the drive rod axis) the spring 52 may be preloaded to about 17 pounds. Note that in the current embodiment, the over center position corresponds to about a 67% extension of the leg rest assembly 16. Thus, when the spring 52 is over center, the preload tends to act through the axis of the drive shaft 26 thereby tending to move the leg rest assembly 16 in neither direction. As the drive shaft 26 rotates from the over center point, it causes the spring force to act on the end of the toggle lever 38 at a short moment arm (i.e., distance perpendicular to the spring force) from the axis of the drive shaft 26. Accordingly, the moment applied to the drive shaft 20 by the spring 52 is relatively small near the over center position due to the relatively short moment arm. As the drive shaft 20 continues to rotate, the moment arm increases in proportion to the sine of the increasing drive shaft 26 angle from the over center position. Therefore, the spring 52 smoothly develops an increasingly large biasing force as the drive shaft 26 rotates towards the extended or retracted positions.

While the preferred embodiment has been described with particularity of the springs parameters and force generation, one skilled in the art will recognize that the specification of a given toggle assembly are dictated by the parameters of a given chair. For example, the spring rates may be increased to accommodate a chaise-type leg rest mechanism that tends to be heavier than non-chaise-type leg rest. Likewise, the kinematics of the toggle assembly may be such that the moment arm at the extended position ($I_e$) and at the retracted position ($I_r$) provide a different force balance, thereby requiring modification of the spring parameters.

Moreover, because the spring 52 is loaded at all times (even at the over center point,) the spring tends to draw the drive rod 26, the support shaft 28, and the components of the spring toggle assembly 14 firmly together. Thus, the preload reduces relative movement and backlash between these components. Accordingly, the present invention provides a quieter, smoother actuation mechanism 10 than the prior art. Note should also be made, that for a given article of furniture 12, the preferred biasing forces and preload (discussed below) may be determined empirically.

In another embodiment, the engagement member 54 includes a hook to slidably engage the support shaft 28. While a hook 54 with a diameter d1 equal to a diameter d2 of the support shaft 28 may be employed, a diameter d1 exceeding the diameter d2 is preferred. More particularly, it has been found that hooks 54 with the diameter d1 equal to diameter d2 tend to fail at a portion 62 of the spring 52 adjacent the hook 54 (i.e., adjacent the support shaft 28). In contrast, hooks 54 with diameters d1 larger than d2 provide reliable and predictable service life when exposed to the designed level of cyclic stress. A diameter d1 between about 130% and about 170% of the diameter d2 is desirable. As presently preferred, a hook having a diameter of ¾ inches is used over a support shaft having a diameter of ½ inches.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. In an article of furniture having a seat assembly supported from a chair frame and an actuation mechanism for enabling a leg rest assembly to move between a stowed position and an extended position, the mechanism including a support shaft, a drive rod spaced apart from the support shaft, and a toggle link coupled to the drive rod, a spring assembly comprising:

a spring with a first end attached to the toggle link and a second end directly and slidably engaging the support shaft, whereby the second end is slidable along a substantially circular-shaped, unobstructed portion of the support shaft and parallel with an axis defined by the support shaft to align the spring thereon.

2. The spring assembly according to claim 1 further comprising a member formed on the second end, the member having an inner diameter larger than a diameter of the support shaft, the member being slidable on the unobstructed portion of the support shaft permitting a stress of the spring to be reduced.

3. The spring assembly according to claim 2, wherein the member further comprises a hook.

4. The spring assembly according to claim 1, consisting essentially of a single spring sized to provide all of an extended biasing force to retain the leg rest assembly in the extended position when the leg rest assembly is in the extended position, whereby the single spring biases the leg rest assembly in the extended position.

5. The spring assembly according to claim 4, wherein the single spring is sized to provide all of a stowed biasing force to retain the leg rest assembly in the stowed position when the leg rest leg rest assembly is in the stowed position, whereby the single spring biases the leg rest assembly in the stowed position.

6. The spring assembly according to claim 5, wherein the single spring is to be positioned relative to the support shaft so that the stowed biasing force is less than the extended biasing force.

7. In an article of furniture of the type having a seat assembly supported from a chair frame and an actuation mechanism for enabling a leg rest assembly to move between a stowed position and an extended position, the mechanism comprising:

a support shaft;

a drive rod spaced apart from the support shaft;

a toggle link coupled to the drive rod; and a biasing assembly including a spring with a first end attached to the toggle link and a second end directly and slidably engaging the support shaft, whereby the second end is slidable along a substantially circular-shaped, unobstructed portion of the support shaft and parallel with an axis defined by the support shaft to align the spring thereon.

8. The mechanism according to claim 7 further comprising a member formed on the second end, the member having an inner diameter larger than a diameter of the support shaft, whereby stress on a portion of the spring assembly adjacent the support shaft is reduced.

9. The mechanism according to claim 8, wherein the member further comprises a hook.

10. The mechanism according to claim 7, consisting essentially of a single spring sized to provide all of an extended biasing force to retain the leg rest assembly in the extended position when the leg rest leg rest assembly is in the extended position, whereby the single spring biases the leg rest assembly in the extended position.

11. The mechanism according to claim 10, wherein the single spring is sized to provide all of a stowed biasing force to retain the leg rest assembly in the stowed position when the leg rest leg rest assembly is in the stowed position, whereby the single spring biases the leg rest assembly in the stowed position.

12. The mechanism according to claim 11, wherein the single spring is positioned relative to the support shaft so that the stowed biasing force is less than the extended biasing force.

13. The mechanism according to claim 7, wherein the toggle link is rigidly secured to the drive rod.

14. The mechanism according to claim 13, wherein the drive rod is received through an aperture formed in the toggle link.

15. The mechanism according to claim 7, wherein the unobstructed portion of the support shaft further comprises a smooth surface.

16. A method of assembling an article of furniture of the type having a seat assembly supported from a chair frame and an actuation mechanism for enabling a leg rest assembly to move between a stowed position and an extended position, the actuation mechanism including a support shaft, a drive rod spaced apart from the support shaft, and a toggle link coupled to the drive rod, the method comprising:

attaching a first end of a spring to the toggle link; and slidably engaging a second end of the spring directly to a substantially circular-shaped, unobstructed portion of the support shaft whereby the second end is slidable along an axis defined by and parallel to the support shaft to align the spring thereon.

17. The method according to claim 16 further comprising reducing stress on the spring by sizing an inner diameter of the second end to be larger than a diameter of the support shaft to operably permit self alignment of the spring along the unobstructed portion of the support shaft.

18. The method according to claim 17, wherein the second end further comprises a hook.

19. The method according to claim 16, further comprising sizing a single spring to provide all of an extended biasing force to retain the leg rest assembly in the extended position when the leg rest leg rest assembly is in the extended position, whereby the single spring biases the leg rest assembly in the extended position.

20. The method according to claim 19, further comprising sizing the single spring to provide all of a stowed biasing force to retain the leg rest assembly in the stowed position when the leg rest leg rest assembly is in the stowed position, whereby the single spring biases the leg rest assembly in the stowed position.

21. The method according to claim 20, further comprising positioning the single spring relative to the support shaft so that the stowed biasing force is less than the extended biasing force.

* * * * *

UNITED STATES PATENT AND TRADEMARK OFFICE

CERTIFICATE OF CORRECTION

PATENT NO. : 6,988,769 B2 Page 1 of 1
APPLICATION NO. : 10/849995
DATED : April 19, 2006
INVENTOR(S) : Larry P. LaPointe It is certified that error appears in the above-identified patent and that said Letters Patent is hereby corrected as shown below:

Column 1,
Lines 5-20, "replace Paragraph [0001]" should read -- replace Paragraph [0002] --;

Column 5,
Line 17, "see" should read -- seen --;

Column 6,
Line 34, after "may" delete "be" (first occurrence);

Column 7,
Line 61, delete "leg rest" (second occurrence);

Column 8,
Lines 26 and 32, delete "leg rest" (second occurrence);

Column 9,
Line 4, delete "leg rest" (second occurrence);

Column 10,
Line 1, delete "leg rest" (second oocurrence).

Signed and Sealed this

Eleventh Day of July, 2006

JON W. DUDAS
*Director of the United States Patent and Trademark Office*

UNITED STATES PATENT AND TRADEMARK OFFICE

CERTIFICATE OF CORRECTION

PATENT NO. : 6,988,769 B2
APPLICATION NO. : 10/849995
DATED : January 24, 2006
INVENTOR(S) : Larry P. LaPointe It is certified that error appears in the above-identified patent and that said Letters Patent is hereby corrected as shown below:

<u>Column 1,</u>
Lines 5-20, “replace Paragraph [0001]” should read -- replace Paragraph [0002] --;

<u>Column 5,</u>
Line 17, “see” should read -- seen --;

<u>Column 6,</u>
Line 34, after “may” delete “be” (first occurrence);

<u>Column 7,</u>
Line 61, delete “leg rest” (second occurrence);

<u>Column 8,</u>
Lines 26 and 32, delete “leg rest” (second occurrence);

<u>Column 9,</u>
Line 4, delete “leg rest” (second occurrence);

<u>Column 10,</u>
Line 1, delete “leg rest” (second occurrence).

This certificate supersedes certificate of correction issued July 11, 2006.

Signed and Sealed this

Eighth Day of August, 2006

JON W. DUDAS
*Director of the United States Patent and Trademark Office*

UNITED STATES PATENT AND TRADEMARK OFFICE

CERTIFICATE OF CORRECTION

PATENT NO. : 6,988,769 B2
APPLICATION NO. : 10/849995
DATED : January 24, 2006
INVENTOR(S) : Larry P. LaPointe It is certified that error appears in the above-identified patent and that said Letters Patent is hereby corrected as shown below:

Column 1,
Delete lines 5-11 and insert therefore: -- The present invention relates to furniture and, more particularly, to an improved leg rest extension mechanism for articles of furniture such as chairs, sofas, and loveseats. --;
Line 19, "tends" should read -- tend --;

Column 5,
Line 17, "see" should read -- seen --;

Column 6,
Line 34, after "may" delete "be" (first occurrence);

Column 7,
Line 61, delete "leg rest" (second occurrence);

Column 8,
Lines 26 and 32, delete "leg rest" (second occurrence);

Column 9,
Line 4, delete "leg rest" (second occurrence);

Column 10,
Line 1, delete "leg rest" (second oocurrence).

This certificate supersedes Certificate of Correction issued July 11, 2006 and August 8, 2006.

Signed and Sealed this

Tenth Day of October, 2006

JON W. DUDAS
*Director of the United States Patent and Trademark Office*